Patented Feb. 10, 1931

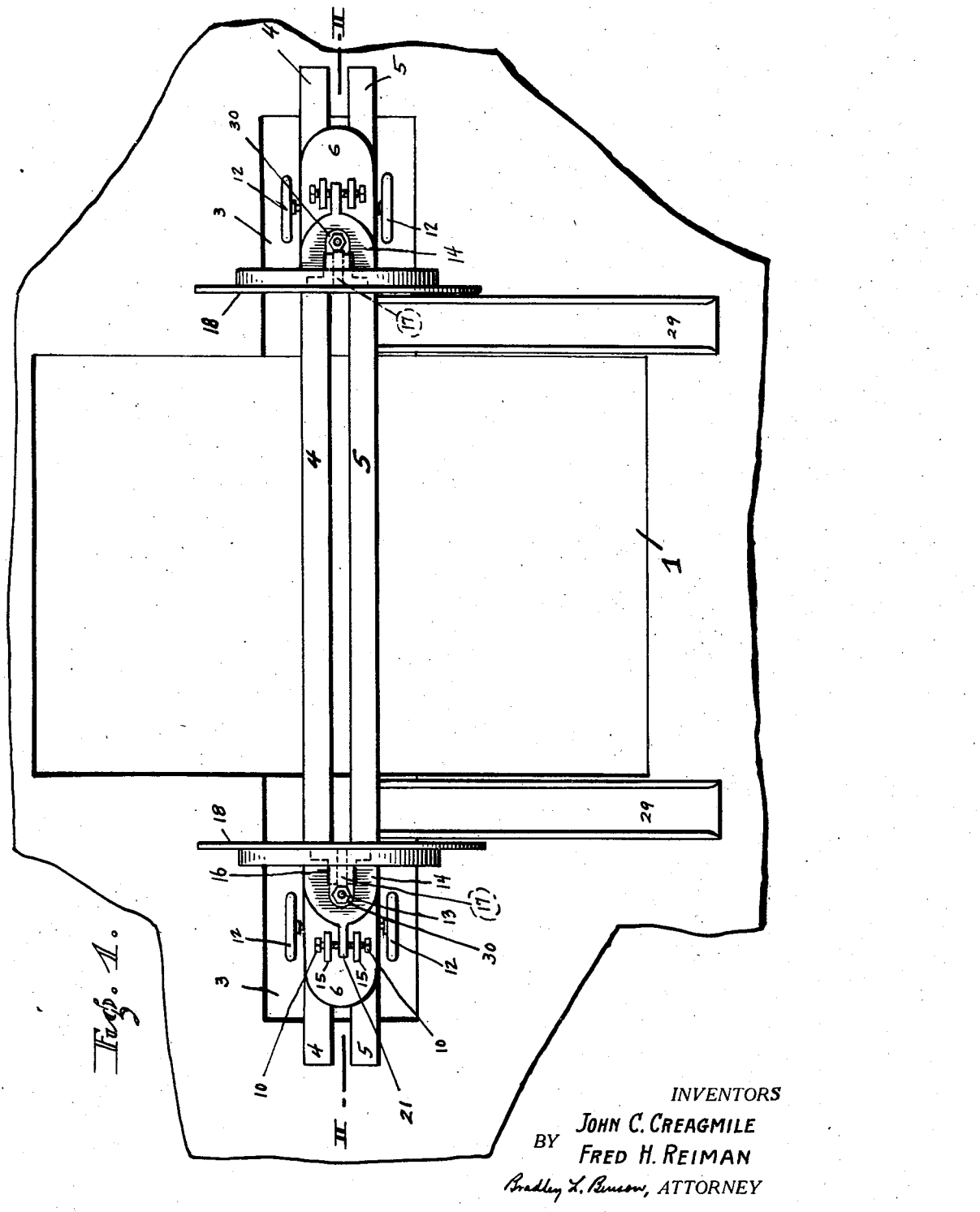
Feb. 10, 1931.  J. C. CREAGMILE ET AL  1,791,803
DEVICE FOR GAUGING THE CAMBER AND TOE-IN OF AUTOMOBILE WHEELS
Filed Nov. 19, 1928    3 Sheets-Sheet 1
INVENTORS
JOHN C. CREAGMILE
FRED H. REIMAN
BY Bradley L. Benson, ATTORNEY Feb. 10, 1931.   J. C. CREAGMILE ET AL   1,791,803
DEVICE FOR GAUGING THE CAMBER AND TOE-IN OF AUTOMOBILE WHEELS
Filed Nov. 19, 1928   3 Sheets-Sheet 2
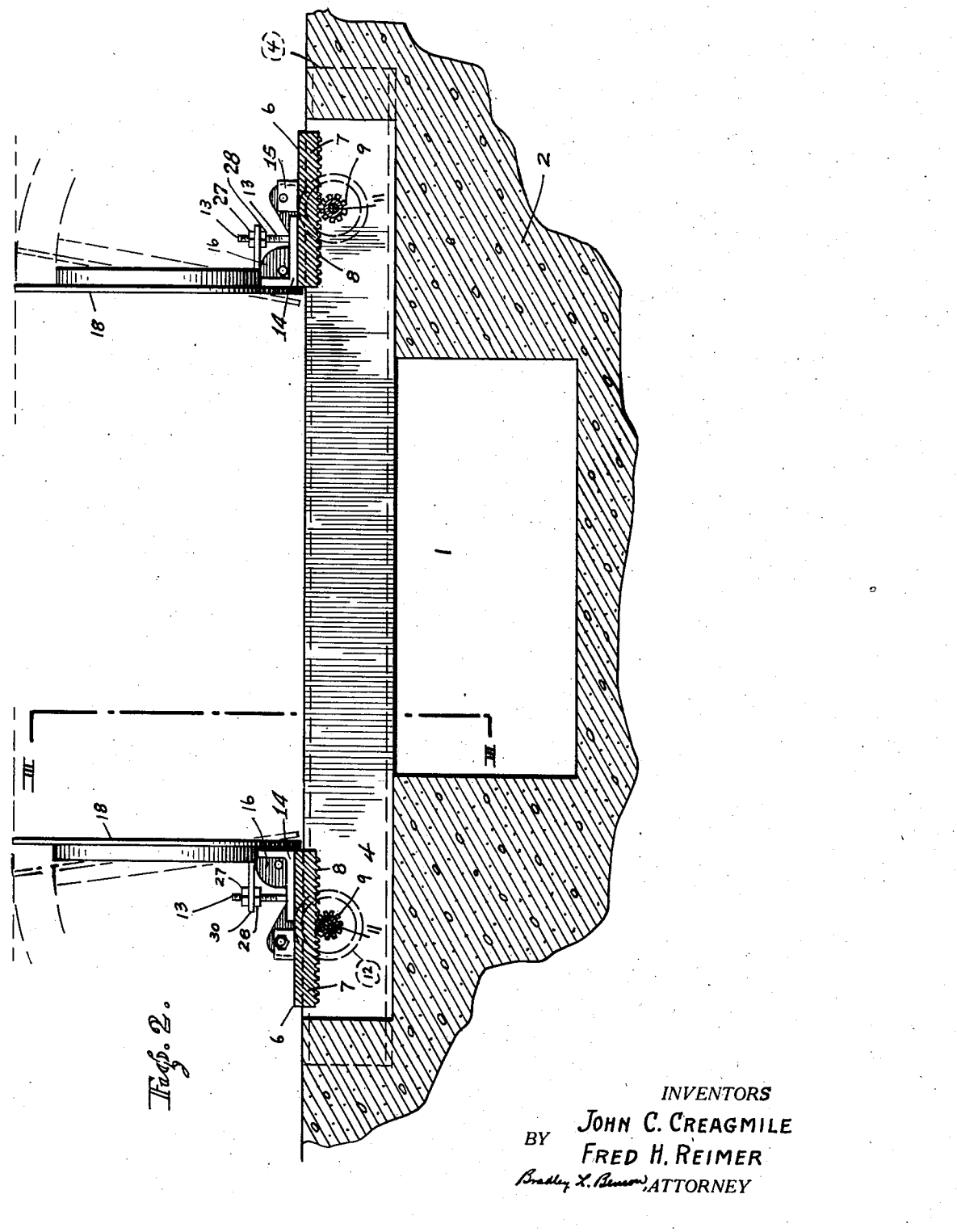
INVENTORS
John C. Creagmile
Fred H. Reimer
BY Bradley L. Benson ATTORNEY

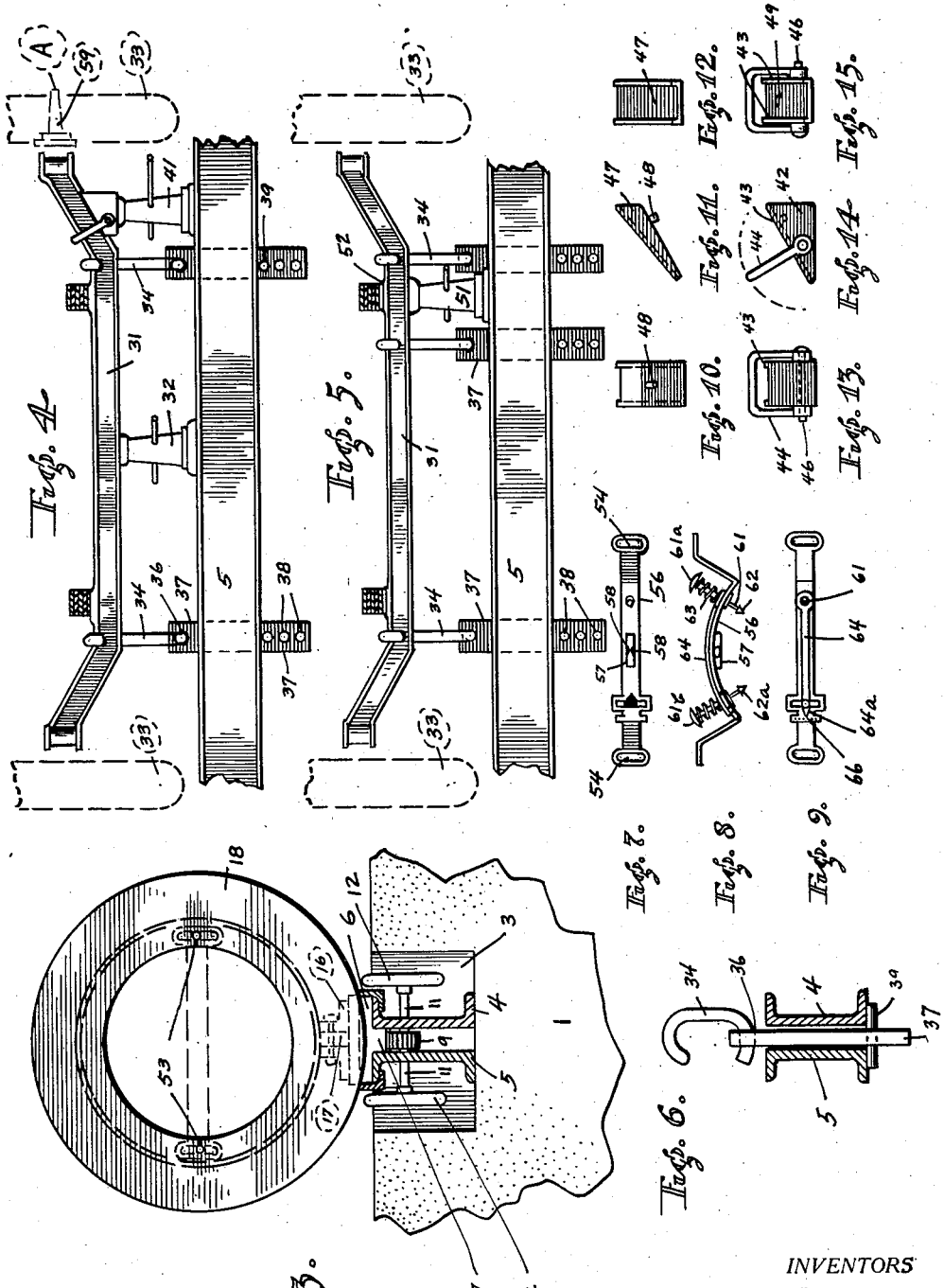

1,791,803

UNITED STATES PATENT OFFICE

JOHN C. CREAGMILE, OF BERKELEY, AND FRED H. REIMAN, OF SAN FRANCISCO, CALIFORNIA

DEVICE FOR GAUGING THE CAMBER AND TOE-IN OF AUTOMOBILE WHEELS

Application filed November 19, 1928. Serial No. 320,395.

The present invention is an improved method and apparatus for adjusting the castor, camber, and toe-in of the steering wheels of an automobile.

The principal object of the invention is the provision of a device, flush with the floor of a garage, upon which an automobile may be driven, said device being provided with disks approximating in diameter that of the steering wheels of an automobile and provided with means whereby said disks may be adjusted to different angular positions and may be moved toward and away from the wheels of said automobile for the purpose of determining their degrees of camber and toe-in before and after corrective treatment has been applied.

Another object is the provision of a device of the character described which may be adjusted to any predetermined position specified for different makes of automobiles, and locked in said position during the operations of corrective treatment.

Our invention contemplates a device, for installation in a service station, onto which an automobile may be driven and the front axle of said automobile bent in a cold state in conformity with standards laid down by engineering authorities as being best adapted to steering wheel practice.

It is a well known fact that, if the camber of the steering wheels is not uniform on both sides of the machine or if the toe-in is too great, undue wear on the tires is certain to occur. While the degree of castor has a direct bearing on the steering wheels and on the driver's control of same, it is highly desirable that these three angular adjustments of the steering wheels are properly made and maintained.

Due to the fact that a slight collision or undue strain or a shock, to an automobile may seriously impair one or more of said adjustments without being noticeable to a layman it is highly desirable to have an apparatus for the quick determination of camber, castor, and toe-in, and our invention provides such an apparatus and because of the peculiarity of construction of our invention, a method of correction has been evolved whereby the treatment necessary to restore the steering wheels to their proper angularity may be effected without dismembering the car and without removing the wheels. Other objects and advantages will be seen as this description proceeds.

In this specification and the annexed drawings, the invention is illustrated in the form considered to be the best, but it is not limited to such form because it may be embodied in other forms, and it is also to be understood that in and by the claims following the description it is desired to cover the invention in whatever form it may be embodied.

In the accompanying three sets of drawings

Figure 1 is a top plan view of our invention as the same appears when cast in a concrete floor over a workman's pit.

Figure 2 is a vertical, longitudinal section of Figure 1, taken on the line II—II of said figure.

Figure 3 is a vertical transverse section of parts shown in Figure 2, said section being indicated by the line III—III of said figure.

Figure 4 is a diagrammatic view illustrating our method of decreasing the camber of a conventional automobile axle.

Figure 5 is a view similar to Figure 4 excepting that the operation is reversed and this figure illustrates the method of increasing the camber of a conventional automobile axle.

Figure 6 is a view showing a pair of sill members in cross-section and showing in side elevation a link and bar in relation thereto.

Figures 7, 8 and 9 are, respectively, front elevation, top plan, and rear elevation of a yoke member.

Figures 10, 11 and 12 are, respectively, rear, side and front elevations of a shim member and Figures 13, 14 and 15 are, respectively, rear, side and front elevations of a jack saddle.

Referring to the drawings the numeral 1 indicates a pit, here shown as a rectangular cavity in a mass 2 of concrete. Similar and shallower pits 3 communicate with the main pit 1 and on the bottom of pits 3 rest sill members 4 and 5. These sills 4 and 5 extend laterally beyond the pits 3 and are embedded in the concrete as indicated in Figures 1 and 2 (spanning the pit) and are preferably formed of two conventional channel irons placed back to back as illustrated in Figure 3.

At 6 we show a bed plate slidable longitudinally on the top of sill members 4 and 5, said bed plate having a tongue 7 extending downwardly between said sills and serving as a guide when said bed plate is moved thereover. The underside of the tongue 7 is provided with teeth as indicated at 8 adapted to mesh with a gear wheel 9 keyed to a shaft 11 which may be rotated by either of hand wheels 12 secured to the ends of said shaft 11 on either side of said sills. At 13, Figures 1 and 2, is a pivot bolt threaded into the bed plate 6 and extending through a hole in a turntable member 14 which overlies the bed plate.

Integral with turntable 14 are L-shaped bracket members 16 between which extend a lug 17 integral with an annular disk member 18. The parts so far described are duplicated and placed in right and left relation as shown in Figure 1 with flat surfaces of the members 18 confronting each other. Being identical the parts are formed from the same patterns and each set is designed to serve one wheel of a front axle of an automobile as will be later described. The purpose of the disks 18 is to determine the degree of toe-in and camber of said wheels and it is therefore desirable that said disks be capable of adjustment to different angular positions with respect to the sills 4 and 5 on two planes, one for toe-in and one for camber. Accordingly the turntable 14 is pivoted on the bolt 13 and may be rotated on said pivot until the desired toe-in position is reached, and held in said position by means of set screws 10 threaded through upwardly extending and spaced lugs 15 integral with the bed plate 6, different ones of said screws being arranged to respectively engage opposite sides of a tongue member 21, integral with the turntable 14 and disposed between the lugs 15. By advancing one of said screws and retracting the other said turntable may be moved and locked as desired. Said screws afford a micrometer adjustment and can be calibrated on the heads for this purpose if desired.

The adjustment for camber is determined as shown in Figure 2 wherein the disks 18 may be moved to the position indicated in dotted lines by the rotation of lug 17 on its pivot bolt extending through said lug and through the lugs 16. Any desired adjustment may be made by means of lock nuts 27 and 28 on the bolt 13 anchored in the turntable 14. Said nuts are threaded on the bolt 13, one on each side of a tongue member 30 integral with, and extending transversely from the disk 18. Tongue 30 is, is effect, the short end of an elbow lever and a micrometer adjustment of the angularity of disk 18 is thus provided by the nuts 27 and 28; said nuts may be calibrated if desired.

Assuming that the parts are assembled as shown in Figures 1 and 2, an automobile to be serviced may be driven with its front wheels in channel members 29, Fig. 1, until the front wheels come to rest on the sills 4 and 5. The position of the disks 18 are predetermined as to camber and toe-in in accordance with the specifications of the make of car to be serviced and rotation of the hand wheels 12 will move either of said disks into contact with the outer side of the steering wheel and an operator can observe at once any deviation from said standard, can determine the treatment necessary to correct said deviation and, by the manipulation of hand wheels 12, move said disk toward or away from said wheel from time to time as necessary during the operation. In Figure 4 we show a conventional automobile axle 31 and the method of servicing same to decrease the camber thereof.

As soon as the car is driven to a position where the front wheels come to rest in the space between the sills 4 and 5 the brakes are set and the car raised vertically, as indicated by the jack 32, Figure 4, until steering wheels, indicated in dotted lines at 33, clear the sills. In order to rigidly secure the axle 31 against any rocking movement on the jack 32 we employ C-shaped links 34, the upper hook of which engages the top side of axle 31 and the lower hook engages an eye 36 in a bar 37, said bar is flat and is provided with a plurality of holes 38 in that end thereof which is remote from the link 34. When the front axle has been raised by jack 32 link 34 is hooked over the axle and through bar 37 and a pin 39 extended through one of the holes 38. Jack 32 is rotated until pin 39 engages the bottoms of sills 4 and 5, as indicated in Figure 6, and until the axle 31 is firmly held in horizontal position at which time either or both of the angle portions of the axle 31 may be bent upwardly at the elbow by means of a jack 41 which exerts an upward pressure on said angular portion. In Figs. 13, 14 and 15 we show a jack saddle consisting of a wedge-shaped body member 42 provided with upstanding flanges 43 which prevent the saddle from slipping off the axle 31. A yoke or bail 44 is secured to the saddle by means of a removable bolt 46 extending through said saddle and through the ends of said bail.

As the degree of angularity of different makes of axles varies we provide shim members 47, shown in Figs. 10, 11 and 12. These shims are wedge-shaped and seat in the saddle 42. A tenon 48 on the underside of said shim engages a hole 49 in the top surface of said saddle 42. Thus, by selecting a shim 47 which approximates the angularity of the axle, an operator removes bolt 46, places the bail 44 over the said axle as shown in Figure 4, reinserts bolt 46 and rotates the jack 41 bending axle 31 to a degree indicated by the disk 18 which disk is moved against the wheel from time to time until the proper degree of bend has been accomplished.

In Figure 5 we show the means for bending axle 31 in the opposite direction. In this instance a jack 51 is placed directly under the spring perch 52 of axle 31. A link 34 is placed on each side of said jack 51. Pins 39 are inserted beneath the sills 4 and 5 and jack 51 is rotated until said links are taut at which time further movement of said jack 51 (which is now the fulcrum) serves to bend axle 31 and bend the angular portion of said axle downwardly thus increasing the camber of wheel 33.

The correction of toe-in is accomplished by adjustment of the tie rod, different means being provided on different makes of steering gear for this purpose. Our device is useful in this respect in that the disks 18 may be rotated on a horizontal axis (bolt 13) to form a correct guide for said adjustment of said tie rod.

We will now describe means for indicating the castor of each steering wheel. The disks 18 are provided with bolt holes 53 which are threaded to engage set screws (not shown) the purpose of which is to extend through slots 54 in a yoke member 56, Figs. 7, 8 and 9, and support said yoke diametrically across said disks. The slots 54 serve to permit vertical adjustment of the member 56 for use opposite wheels of different diameters. When said yoke is attached to disk 18 by means of set screws the device is leveled by means of a spirit level 57 which is fenestrated on opposite sides as indicated at 58 to make the yoke reversible so that one yoke will serve for both wheels. Inasmuch as the castor of a wheel is determined by the deviation of its axis from the vertical, rotation of a spindle (indicated in dotted lines at 59, Fig. 4) on its axis will cause the end A of said spindle to raise when said spindle is rotated from one end of its arc to the other. In order to determine the degree of castor we utilize this fact and, accordingly, bend the yoke 56 on a curve struck from the center of rotation of said spindle which in automobile construction is the king pin on which the steering head is pivoted. A bolt 61 having a conical point 62 is slidably mounted in the yoke 56. Said bolt is normally held in retracted position by an expansive spring 63 bearing at one end against the head 61A of said bolt and at the opposite end against an arm 64 pivotally mounted on said bolt. When said yoke is attached to disk 18 as indicated in dotted lines in Fig. 3, pin 61 is extended, (spring 63 yielding under pressure) until the conical head 62 of said bolt enters the countersink in the end A of the spindle 59. Bolt 61 is then retracted and the spindle 59 rotated until its end A reaches the opposite end of its arc of travel at which position the arm 64 is raised on its pivot to a point where the conical head 62a of a pin 61b engages the countersink in the end A of spindle 59. Due to the deviation from the vertical of the axis of the spindle 59 the end A of said spindle will be considerably higher at this end of its arc of travel and the degree of this elevation will be indicated by the pointed end 64a of arm 64 and the coincidence of said point with graduations 66 will apprise the operator of the degree of castor and indicate the necessary corrective treatment. This correction is accomplished by placing shims under the spring saddles.

We claim:

1. A wheel-aligning device comprising an automobile run-way, a track extending transversely across said runway, turn-table members supported on and movable along said track, disk members carried on said turntables in upright position and for angular adjustment with respect thereto, and provided with mutually confronting flat surfaces, means for adjusting the angularity of said surfaces relative to said turntables, means for rotating said turntables, and means for moving said turntables toward or from each other along said track.

2. In a wheel gauging device of the character described, a disk element having a plane face for disposal opposite and adjacent the outer face of a dirigible wheel of a cooperating pair thereof, a member carrying said disk for adjustment about perpendicularly related axes to dispose said face for use as a plane of reference with respect to said wheel face for determining the correctness of both the camber and toe-in of the said wheel, and means to independently adjust said disk about the respective said axes.

3. In a device for gauging the camber and toe-in of a cooperating pair of automobile steering wheels, disks approximating the size of said wheel and for disposal opposite the respective wheels, members carrying said disks for independent angular adjustment thereof about horizontal and vertical axes, means to secure said disks in their angularly adjusted positions on said members, means supporting said members for movement toward or from each other and to adjusted positions thereof, and means for effecting said movement of said members to said positions.

4. In a device for gauging the camber and toe-in of a cooperating pair of automobile steering wheels carried at the extremities of a horizontal axle, movable bed-plates, a base member carrying said bed-plates for independent adjustment along a line parallel to and beneath the longitudinal axis of said axle, turntables mounted on said bed plates for adjustment about vertical axes, disk members mounted on said turntables for adjustment about horizontal axes and having plane and mutually confronting faces for simultaneous disposal opposite and adjacent the outer faces of the different said wheels to provide planes of reference with respect to the opposed wheel faces, means to fix said turntables in adjusted position to dispose the face of said disk members for indicating the correct degree of toe-in for said wheels, and means to fix said disk members in adjusted position with respect to said turntables to dispose said disk faces for indicating the correct degree of camber for said wheels.

In testimony whereof we affix our signatures.

JOHN C. CREAGMILE.
FRED H. REIMAN.